May 26, 1931. G. B. CHADWICK 1,806,891
BUSHING
Filed Feb. 19, 1929
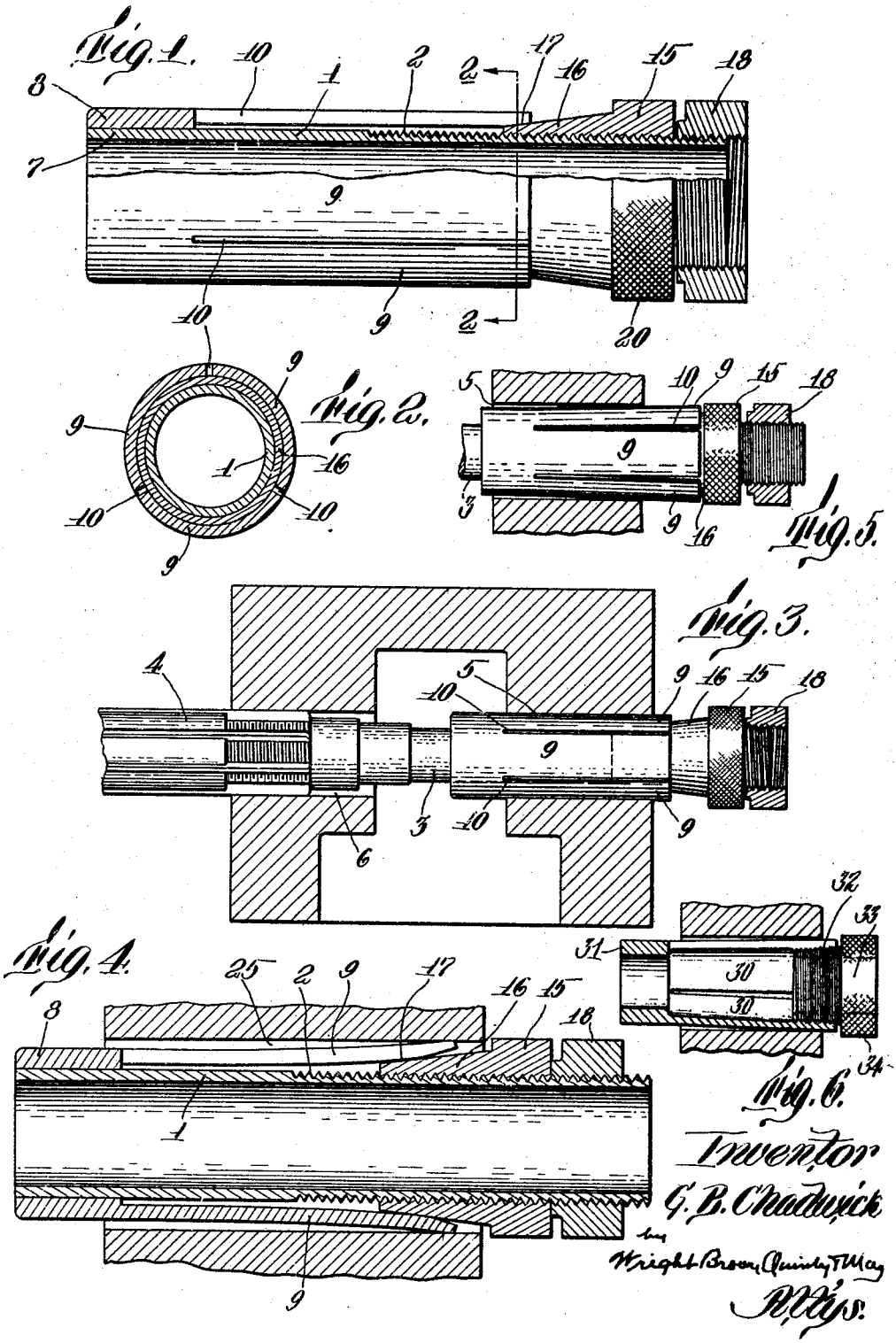
Inventor
G. B. Chadwick Patented May 26, 1931

1,806,891

UNITED STATES PATENT OFFICE

GEORGE B. CHADWICK, OF PORTSMOUTH, NEW HAMPSHIRE

BUSHING

Application filed February 19, 1929. Serial No. 341,113.

This invention relates to expanding bushings, more particularly to that type suitable to serve as guides for tools such as reamers, burnishers, or the like, provided with pilot portions. Such bushings have heretofore been made with a relatively large diameter non-expanding end portion and an expanding and contracting end portion of smaller diameter arranged to be inserted into the hole by the wall of which the tool is to be guided. I find, however, that such bushings are more satisfactory in operation when the end of the fixed diameter first enters the hole, the portion of adjustable diameter engaging the work back from the entering end of the bushing, and the bushing of this invention is so constructed.

For a more complete understanding of this invention, reference may be had to the accompanying drawings in which Figure 1 is a side elevation partly broken away and in section of a bushing constructed in accordance with this invention.

Figure 2 is a section on line 2—2 of Figure 1.

Figure 3 is a section through a piece of work showing the bushing in operative position therein and guiding a reamer.

Figure 4 is a fragmentary sectional view showing the bushing locked in an expanded position and in operative position in a hole in the work.

Figure 5 is a view partly in section showing the bushing in a hole, the outer end of which is used to center the tool pilot.

Figure 6 is a sectional view illustrating a modified bushing construction.

In the embodiment of the invention shown in these drawings, at 1 is indicated a sleeve a considerable portion of one end of which, as at 2, is shown as threaded. This sleeve forms a bearing designed to receive the pilot portion 3 of a tool such as a reamer 4, as shown in Figure 3, in order to guide the tool in accordance with the position of a hole 5 in work spaced at a distance from the hole 6 in which the tool is then working, the wall of the hole 5 acting to center and support the bushing. In order that the sleeve 2 may be held centered with relation to the hole 5, it is shown as carrying at its end portion 7 remote from the threaded portion 2, a tubular member 8 having extended therefrom, and as shown integral therewith, a plurality of fingers 9. The member 8 may, if desired, be slightly tapered externally, its smaller end being the more remote from the fingers 9, to facilitate insertion of the bushing in a hole of the minimum diameter which will receive it. These fingers may be formed by cutting inwardly from the opposite end of the tube 8 as at the kerfs 10, these kerfs as shown extending to the portion 8, which is of somewhat smaller internal diameter than the cut portion and is fixed on the sleeve as by pressing thereon, or by any other suitable means, the finger portions 9 extending lengthwise of the sleeve about its periphery and spaced somewhat therefrom. As shown three finger portions 9 are employed, though a larger number might be employed, if desired. At least three is desirable, as this number produces a proper centering action of the sleeve in the hole in the work. The sleeve portion 7 is at the entering end of the bushing and the outer free ends of the fingers 9, which project over the threaded portion 2 of the sleeve 1, may be sprung away from the outer face of the sleeve, thus to be adjustable in effective outside diameter so as to engage and be centered in holes in the work of somewhat different diameters. In order that the fingers may be thus spread outwardly the sleeve 1 is shown as provided with an annular member or nut 15 engaging its threaded portion, this nut having a tapering extension 16 adapted to pass between the outer face of the sleeve 1 and the free extremities of the fingers 9, these extremities preferably being matingly beveled, as at 17, in order to form a suitable engaging surface adapted to ride on the tapered portion 16. By turning the nut 15, which is accessible adjacent to the free ends of the fingers, thus adjusting the nut axially on the sleeve, the amount to which the free ends of the fingers 9 are sprung outwardly may be adjusted and thus the maximum diameter of the effective guiding portion of the bushing in the work may be adjustably determined.

It is sometimes desirable to fix the nut 15 in an adjusted position in order that the maximum work-engaging diameter of the bushing may be set at a fixed desired value. For this purpose means for locking the nut 15 in any desired position may be provided, as shown this means comprising a check nut 18 engageable with the threads of the sleeve 1 outwardly of the nut 15. Preferably, as shown, both the nuts 15 and 18 have knurled cylindrical peripheries as at 20 so that they may be readily actuated by the fingers.

In Figure 3 the bushing is shown as inserted in the hole 5, this hole being of substantially the minimum diameter for the particular bushing so that the fingers 9 are substantially at their inward limit of motion radially with reference to the axis of the sleeve.

In Figure 4 a larger hole 25 is illustrated through which the cylindrical portion 8 of the bushing may be freely passed. The free ends of the fingers 9, however, are shown as pressed outwardly by engagement with the tapered portion 16 of the nut 15 so as to engage the inner wall of the hole 25, the bushing thus being in an expanded condition. The engagement of the free ends of the fingers 9 with the interior wall of the hole 25, however, serves to correctly center the sleeve 1 within the hole 25 in position to receive the pilot 3 of the tool, the smaller end of the bushing being free to accommodate itself to axial alinement with the tool. Thus the tool is supported centrally with relation to that portion of the hole 25 with which the fingers 9 are in engagement. The tool is thus properly guided for its operative movement through the hole 6 and when the bushing is pushed out of the hole, such as 5 or 25, by continued axial movement of the tool, the hole 5 or 25 is acted on by the tool and brought into proper alinement with the hole 6. In Figure 4, also, the fingers 9 are shown as locked in their extended position by engagement of the check nut 18 against the outer face of the nut 15. The fingers 9 being normally biased to a position defining a smaller outside diameter than when expanded, as shown in Figure 4, they assume the smallest diameter position permitted by the position of the nut 15. The adjustment of the free ends of the fingers 9 is radially uniform for all with reference to the tool and sleeve axis, since the taper portion 16 is uniform, being frusto-conical. As shown the fingers and tube 8 are made separate from the sleeve 7 for ease in assembly of the parts, but functionally they are integral with the sleeve.

In Figure 5 the bushing is shown as guiding the pilot 3 of the tool by the outer end of the hole in the work. This is desirable, for example, when reaming wrist pin holes in pistons after the holes have become worn in service. As the wrist pins do not pass entirely through the piston, the outer ends of the holes do not become worn in service and thus form proper surfaces by which to control the angularity of the reamer so that the reamed hole shall be properly located. By adjustment of the nut 15 the external taper of the bushing may be adjustably determined and the maximum diameter may be sufficiently larger than the diameter of the hole with which the bushing is designed to be used so that the bushing may have bearing on the outer edge of the hole only as shown in this figure, the inner end of the bushing being spaced from the wall of the hole so as to be free to conform to the axial direction of the tool pilot 3.

In Figure 6 a modification is shown in which the expansible fingers 30 are fixed to or integral with a pilot guide portion 31 preferably of a less inside diameter than the fingers so that the fingers may be out of contact with the pilot. These fingers as shown have end portions shaped to engage the tapered threaded end portion 32 of the expanding plug or sleeve 33 provided with the knurled actuating periphery 34. In this construction the expansion of the free ends of the fingers is effected by their threaded engagement with the adjusting plug instead of employing an externally threaded sleeve with which an adjusting end engages as shown in Figures 1 to 5.

Having thus described an embodiment of this invention it should be evident to those skilled in the art that various changes and modifications might be made therein without departing from its spirit or scope as defined by the appended claims.

I claim:

1. A device of the class described comprising a sleeve having an externally threaded end portion, a tube surrounding and fixed to the opposite end of said sleeve, and having integral spring fingers extending about said threaded portions and having free ends, and a nut threaded on said threaded end and having a tapered portion engageable with the inner faces of said free ends to force said free ends outward from the axis of said sleeve to an amount dependent on the axial position of said nut.

2. A device of the class described comprising a sleeve having an externally threaded end portion, a tube surrounding and fixed to the opposite end of said sleeve, and having integral spring fingers extending about said threaded portions and having free ends, a nut threaded on said threaded end and having a tapered portion engageable with the inner faces of said free ends to force said free ends outward from the axis of said sleeve to an amount dependent on the axial position of said nut, and means for locking said nut in any desired position.

In testimony whereof I have affixed my signature.

GEORGE B. CHADWICK.